United States Patent [19]

Taguchi

[11] Patent Number: 4,727,785
[45] Date of Patent: Mar. 1, 1988

[54] CUTTING MACHINE

[75] Inventor: Masayuki Taguchi, Hadano, Japan

[73] Assignee: Amada Company, Limited, Japan

[21] Appl. No.: 933,332

[22] Filed: Nov. 19, 1986

Related U.S. Application Data

[63] Continuation of Ser. No. 796,510, Nov. 13, 1985, abandoned, which is a continuation of Ser. No. 721,131, Apr. 8, 1985, abandoned, which is a continuation of Ser. No. 502,292, Jun. 8, 1983, abandoned.

[30] Foreign Application Priority Data

Jun. 8, 1982 [JP] Japan ................... 57-96988

[51] Int. Cl.⁴ .................. B23D 55/04; B26D 7/06; B26D 7/18
[52] U.S. Cl. ...................... 83/113; 83/277; 83/788; 408/56; 408/67
[58] Field of Search ............... 83/277, 113, 167, 169, 83/788; 82/32; 29/DIG. 99, DIG. 100, DIG. 101; 409/137; 408/56, 67

[56] References Cited

U.S. PATENT DOCUMENTS

| | | | |
|---|---|---|---|
| 1,665,471 | 1/1928 | Marcell | 83/277 |
| 1,912,622 | 6/1933 | Cone | 29/DIG. 99 |
| 1,926,997 | 9/1933 | Hoelscher et al. | 83/32 |
| 2,452,674 | 11/1948 | Nenninger et al. | 29/DIG. 101 |
| 3,123,270 | 3/1964 | Olson | 83/277 X |
| 3,182,538 | 5/1965 | Whitmore et al. | 83/277 X |
| 3,709,075 | 1/1973 | Goellner | 83/113 X |

FOREIGN PATENT DOCUMENTS 27762  3/1981  Japan ................... 408/56

Primary Examiner—E. R. Kazenske
Assistant Examiner—Hien H. Phan
Attorney, Agent, or Firm—Wigman & Cohen

[57] ABSTRACT

A cutting machine is provided in which the front and rear vises which deliver the material to be cut to the blade are mounted together on the same elongated guide members so as to insure a perfectly even cut across the material. Additionally, there is provided a pan for collecting the cutting chips and cutting oil from the work area as well as a filter for separating the cutting chips from the cutting oil.

3 Claims, 3 Drawing Figures

CUTTING MACHINE

This application is a continuation of application Ser. No. 796,510, filed Nov. 13, 1985, now abandoned, which is a continuation of Ser. No. 721,131, filed Apr. 8, 1985, now abandoned, which is a continuation of Ser. No. 502,292, filed June 8, 1983, now abandoned.

BACKGROUND OF THE INVENTION

1. Field of the Invention

The present invention relates generally to cutting machines such as bandsaw machines, hacksawing machines, circular sawing machines and abrasive cut-off machines, and more particularly, the present invention pertains to apparatus for vising and feeding workpieces or materials to be cut and for removing and separating cutting oil and cutting chips in cutting machines.

2. Description of the Prior Art

There are a variety of cutting machines such as horizontal bandsaw machines, hacksawing machines and circular saw machines which are each provided with a cutting tool such as a saw blade to cut metallic materials such as steel bars. In such cutting machines, workpieces or materials to be cut are held by a vise means which has a pair of fixed and movable jaws to grip or clamp the workpieces therebetween during cutting operations. Also, automatic cutting machines for cutting generally elongated workpieces are provided with two vise means, one of which is often referred to as the front vise or stationary vise and the other which is often called the rear vise or movable vise. The front vise is fixedly disposed to clamp and hold the workpieces being cut at the cutting zone where cutting is performed by the cutting tool, while the rear vise is movably provided to clamp and feed the workpieces into the cutting zone. More particularly, the rear vise clamps and brings the workpieces into the front vise which has opened its jaws at the cutting zone and then it is returned to its original position after the front vise has gripped and clamped the workpieces. Also during cutting operations in cutting machines, cutting oil or coolant is continuously applied to the cutting tool and the workpieces being cut in order to facilitate the cutting action and prolong the life of the cutting tool. Of course, it is necessary to remove cutting chips which are produced from the workpieces being cut during cutting operations in cutting machines.

In the cutting machines of the above description, it is necessary that the clamping surfaces of the fixed jaws of the front and rear vises be completely aligned with each other so as to enable the cutting tool to make an accurate cutting action. Heretofore, however, it has been very difficult and time-consuming and accordingly costly to make the clamping surfaces of the front and rear vises completely aligned with each other when assembling the cutting machines.

Another conventional disadvantage with the cutting machines has been that the cutting oil and the cutting chips will splatter and get dirty during cutting operations on and near the cutting machines. Therefore, it is desirable that the cutting oil be effectively collected to be reused and that the cutting chips be easily removed and collected from the cutting machines.

SUMMARY OF THE INVENTION

It is an object of the present invention to provide a cutting machine in which the clamping surfaces of the fixed jaws of the front and rear vises can be easily aligned with each other during assembly.

It is another object of the present invention to provide a cutting machine in which the cutting oil and the cutting chips can be effectively and easily collected without getting dirt on and around the cutting machine.

In order to attain these objects of the present invention, a cutting machine is so designed that the front and the rear vises are mounted together on the same elongated guide members. Also, a cutting machine is provided with a means for collecting the cutting oil and the cutting chips under the cutting zone and further a means is provided for removing the cutting chips out of the cutting machine after separating them from the cutting oil.

Other and further objects and advantages of the present invention will be apparent from the following description and accompanying drawings which, by way of illustration, show a preferred embodiment of the present invention and the principle thereof.

BRIEF DESCRIPTION OF THE PREFERRED EMBODIMENTS

Figure 1:
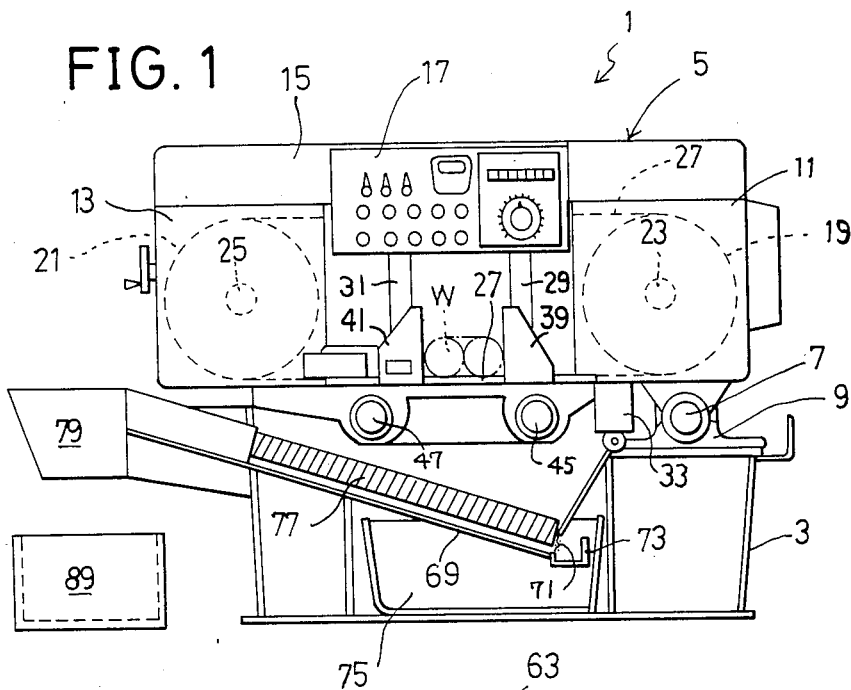
FIG. 1 is a front elevational view, with a portion broken away, of a horizontal bandsaw machine embodying the principles of the present invention.

Referring now to the accompanying drawings, the present invention will be described as embodied in a horizontal bandsaw machine which is generally designated by the numeral 1 in FIGS. 1, 2 and 3. However, it is initially to be noted that the present invention is applicable to any suitable type of cutting machine such as a hacksawing machine or a circular sawing machine (as has been already described hereinbefore).

The horizontal bandsaw machine 1 comprises a boxlike base 3 on which a workpiece or workpieces W to be cut are placed and held in a manner to be described in great detail. It also comprises a cutting head assembly 5 which is pivotally connected to the base 3 by means of a hinge pin 7 held in the hinge brackets 9 so as to be raised away from and lowered to the base 3.

The cutting head assembly 5 has spaced housing sections 11 and 13 connected with each other by a beam member 15 and is provided at its top with a control box 17 which has a variety of controls. In the cutting head assembly 5, a driving wheel 19 and a driven wheel 21 having shafts 23 and 25, respectively, are enclosed in the housing sections 11 and 13, respectively, and a flexible endless bandsaw blade 27 is trained therearound so that it may be driven to make a cutting action when the driving wheel 19 is power driven. The bandsaw blade 27 is slidably held or guided with its cutting edge faced perpendicularly downwardly by a fixed guide assembly 29 and a movable guide assembly 31 so that a cutting stretch may be provided therebetwen at the cutting zone of the horizontal bandsaw machine 1. The fixed and movable guide assemblies 29 and 31 are mounted on the beam member 15 in a manner such that they depend therefrom in parallel with each other. The fixed guide assembly 29 is fixedly mounted on the guide beam member 15 while the movable guide assembly 31 is so mounted that it may be fixed on the beam member 15 in operation but may be moved toward and away from the fixed guide assembly 29 to adjust the cutting stretch of the bandsaw blade 27 according to the size of the workpiece W to be cut. The cutting head assembly 5 of the above described construction is so arranged as to be raised and lowered around the hinge pin 7 by a suitable means such as a hydraulic motor 33 of a cylinder type having a piston rod. Thus, when the cutting head assembly 5 is swung down around the hinge pin 7 from its raised position, the bandsaw blade 27 rotating around the driving wheel 19 and the driven wheel 21 in the cutting head assembly 5 will be fed to cut the workpiece W which is held on the base 3. As is well-known, the cutting head assembly 5 can be automatically raised and lowered for each cutting cycle, and the workpiece W to be cut can be automatically fed into the cutting zone after completion of each cutting action.

In order to hold the workpiece W to be cut at the cutting zone, there is provided a front vise assembly 35 which comprises a vise bed 37, a fixed jaw 39 having a clamping surface 39cs and a movable jaw 41 having a clamping surface 41cs. The front vise assembly 35 is located above the base 3 on the front side of the cutting plane where the bandsaw blade 27 is raised and lowered by the cutting head assembly as has been described hereinbefore. The fixed jaw 39 of the front vise assembly 35 is fixedly disposed on the vise bed 37, while the movable jaw 41 of the same is so disposed as to be horizontally moved on the vise bed 37 toward and away from the fixed jaw 39 by a hydraulic motor 43 of a cylinder type which is mounted on the vise bed 37. Thus, the fixed and movable jaws 39 and 41 of the front vise assembly 35 can clamp the workpiece W to be cut therebetween when the movable jaw 41 is urged toward the fixed jaw 39 by the hydraulic motor 43. The vise bed 37 of the vise assembly 35 is slidably mounted on a pair of guide rails 45 and 47 which are horizontally disposed on the base 3 in parallel with each other by means of front and rear brackets 49 and 51 and at right angles to the cutting plane of the bandsaw blade 27. The guide rails 45, 47 are removably mounted on the front and rear brackets 49, 51 by means of bolts (FIG. 3, unnumbered). The front vise assembly 35 is normally held fixed on the guide rails 45 and 47 by a suitable means, but it can be so arranged as to be moved thereon by a hydraulic motor 52 of a cylinder type so that the cutting chips can be removed from the cutting zone at need. Also, the front vise assembly 35 is provided with a workpiece receiving plate 54 to receive pieces cut from the workpiece W.

In order to grip and feed the workiece W to be cut into the cutting zone, a rear vise assembly 53 is slidably mounted on the guide rails 45 and 47 on the rear side of the cutting plane of the bandsaw blade 27 so that it can be moved toward and away from the front vise assembly 35. The rear vise assembly 53 is all the same in construction as the front vise assembly 35 in that it comprises a vise bed 55, a fixed jaw 57 having a clamping surface 57cs and a movable jaw 59 having a clamping surface 59cs which is so arranged as to be moved toward and away from the fixed jaw 57 by a hydraulic motor 61. Thus, the rear vise assembly 53 can clamp the workpiece W to be cut when the movable jaw 59 is urged toward the fixed jaw 57 by the hydraulic motor 61 with the workpiece W placed there between. The rear vise assembly 53 of this construction is so arranged as to be moved on the guide rails 45 and 47 toward and away from the front vise assembly 35 by a hydraulic motor 63 of a cylinder type which is mounted on a portion of the base 3. Also, there are provided a plurality of rollers 65 which are freely rotatably disposed on the base 3 by means of brackets 67 so that the workpiece W to be cut can be moved thereon toward the front vise assembly 35 into the cutting zone.

It should be apparent that the front and rear vises 35, 53 are mounted on the guide rails 45, 47 in such a manner that they can be installed on the brackets 49, 51 of the base 3 as an assembly. This mounting arrangement also facilitates disassembly for maintenance purposes.

In operation, in order to feed the workpiece W to be cut, firstly the handsaw blade 27 is raised together with the cutting head assembly 5 away from the cutting zone by the hydraulic motor 33, and the movable jaw 41 of the front vise assembly 35 is moved away from the fixed jaw 39 of the same. Then, the movable jaw 59 of the rear vise assembly 53, which has been placed at the rearmost end of the guide rails 45 and 47, is moved toward the fixed jaw 57 of the same to clamp the workpiece W. On clamping the workpiece W, the rear vise assembly 53 is moved frontward on the guide rails 45 and 47 by the hydraulic motor 63 to feed the workpiece W into the cutting zone between the fixed and movable jaws 39 and 41 of the front vise assembly 35. After the end of the workpiece W to be cut has been fed into the cutting zone, the front vise assembly 35 clamps the workpiece W and then the rear vise assembly 53 releases the workpiece W and is returned to its original position at the rearmost end of the guide rails 45 and 47. Then, the bandsaw blade 27 is lowered together with the cutting head assembly 5 to cut the workpiece W and it is raised again on completing the cutting cycle, and thereafter the same cutting and feeding cycles are repeated.

In the above described arrangement, the clamping surfaces 39cs and 57cs of the fixed jaws 39 and 57 of the front and rear vise assemblies 35 and 53, respectively, should be aligned with each other in such a manner as to be at right angles to the cutting plane of the bandsaw blade 27. If the clamping surface 39cs of the fixed jaw 39 of the front vise assembly 35 is located further inward than the clamping surface 57cs of the fixed jaw 57 of the rear vise assembly 53, the workpiece W will be brought into contact with the fixed jaw 39 of the front vise assembly 35 when being fed and it could not be fed into the cutting zone.

According to the present invention, the front and rear vise assemblies 35 and 53 can be easily assembled so that the clamping surfaces 39cs and 57cs of their fixed jaws 39 and 57, respectively, are sure to be aligned with each other, since they are mounted together on the same guide rails 45 and 47. Also, since the front vise assembly 35 can be moved on the guide rails 45 and 47 by the hydraulic motor 52, it is easy to remove the cutting chips which have been spattered around the front vise assembly 35.

In order to collect the cutting oil and the cutting chips, there is provided beneath the guide rails 45 and 47 a collecting pan 69 which is so formed as to be concave downwardly substantially at its central portion. The collecting pan 69 is disposed beneath the guide rails 45 and 47 to cover the base 3 in a manner such that its concave portion depends downwardly into an opening or concavity of the base 3. Also, the collecting pan 69 is formed at its concave bottom with a bore where a filter means 71 is provided so that only the cutting chips are retained in the collecting pan 69 and the cutting oil can drain therefrom. The collecting pan 69 is further provided with a chip collecting box 73 to collect at the outside of the filter means 71 small cutting chips which will come out through the filter means 71 together with the cutting oil. Also, in order to receive and contain the cutting oil coming out of the collecting pan 69, a cutting oil bin 75 is provided beneath the collecting pan 69 in the opening or concavity of the base 3.

Figure 2:
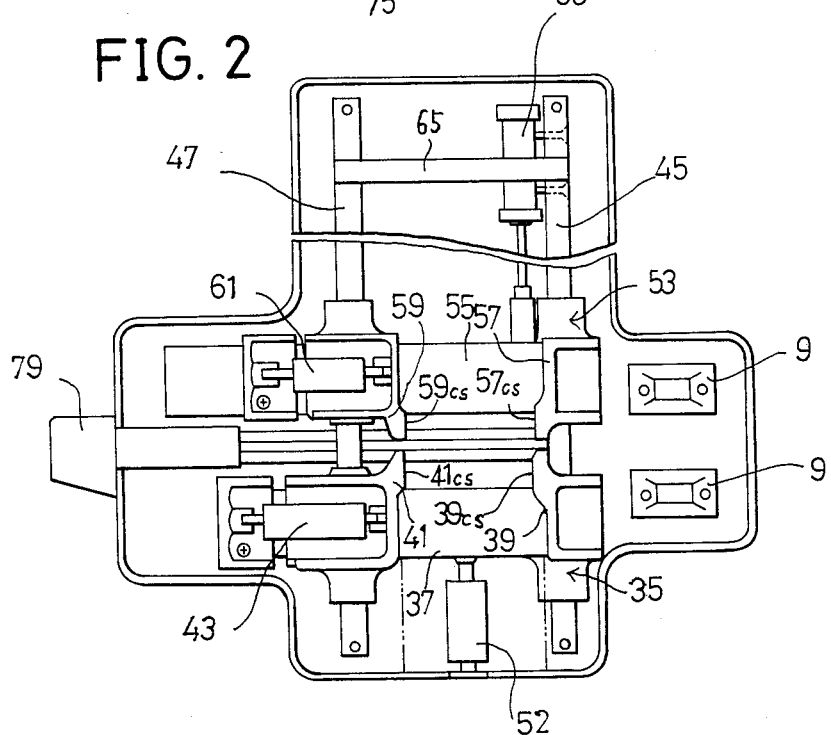
FIG. 2 is a sectional view taken along the line II—II of FIG. 1.
Figure 3:
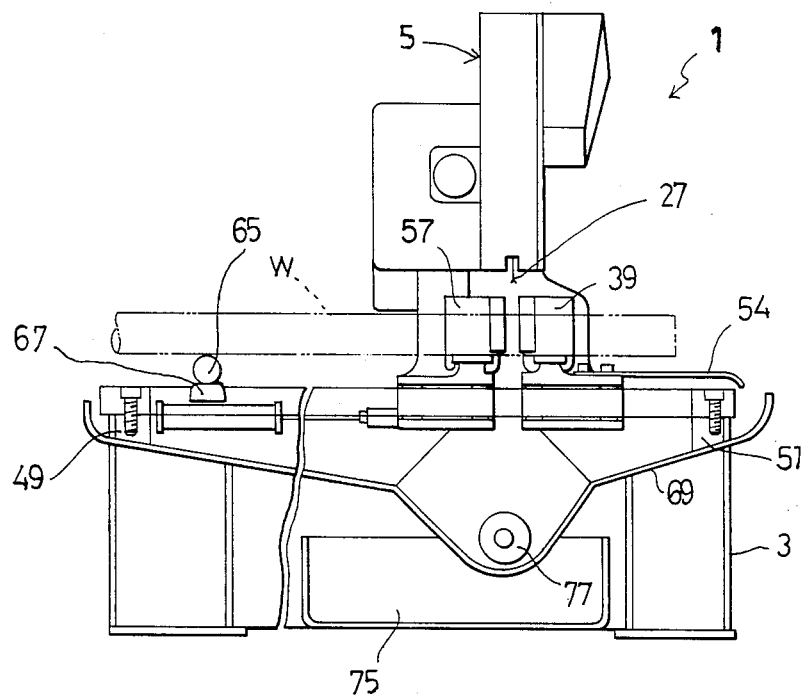
FIG. 3 is a left side elevational view of the horizontal bandsaw machine shown in FIG. 1 with a portion broken away.

As best shown in FIGS. 1 and 2, a screw conveyor 77 is provided to bring the cutting chips out of the collecting pan 69. The screw conveyor 77 is connected with a chute 79, and it is so arranged as to convey the cutting chips into the chute 79 from the collecting pan 69 in a conventional manner. Also, the cutting chips which are conveyed into the chute 79 by the screw conveyor 77 can be received by a suitable container 84.

In the above described arrangement, the cutting oil and the cutting chips coming mainly from the cutting zone during cutting operations will be firstly collected by the collecting pan 69. Then, the cutting chips will be brought out of the collecting pan 69 by the screw conveyor 77 into the chute 79 and then dropped therefrom into the container 84. Also, the cutting oil collected by the collecting pan 69 will be drained therefrom through the filter means 71 and the chip collecting box 73. As has been described, the smaller cutting chips coming through the filter means 71 together with the cutting oil are collected by the chip collecting box 73 without flowing into the cutting oil bin 75.

As will be understood from the above description, the cutting oil and the cutting chips can be effectively collected without becoming dirty on and around the horizontal bandsaw machine 1 since they are collected by the collecting pan 69 disposed just beneath the cutting zone. Also, the cutting oil and the cutting chips spattering near the cutting zone can be more effectively dropped into the collecting pan 69 when the front vise assembly 35 is moved on the guide rails 45 and 47 by the hydraulic motor 52. Furthermore, the cutting oil and the cutting chips are effectively separated by the filter means 71 and the chip collecting box 73, and the cutting oil is drained into the cutting oil bin 75 to be reused, while the cutting chips are removed by the screw conveyor 77 into the container 81.

Although a preferred form of the present invention has been illustrated and described, it should be understood that the device is capable of modification by one skilled in the art without departing from the principles of the invention. Accordingly, the scope of the invention is to be limited only by the claims appended hereto.

I claim:

1. A cutting machine, comprising:
a base;
front and rear brackets carried by said base;
a cutting head having means for holding a cutting tool, said cutting head being disposed on the base and having means connected thereto for moving said head up and down in a cutting zone;
front vise means having a fixed jaw and a movable jaw for holding a workpiece at the cutting zone;
a front vise bed supporting said front vise means, said front vise fixed jaw being fixed to said front vise bed and said front vise moveable jaw being mounted on said front vise bed for horizontal movement in a direction perpendicular to the direction of feed of the workpiece;
first means for moving said front vise moveable jaw toward said front vise fixed jaw to clamp a workpiece therebetween mounted on said front vise bed;
rear vise means having a fixed jaw and a movable jaw for feeding the workpiece into the cutting zone;
a rear vise bed supporting said rear vise means, said rear vise fixed jaw being fixed to said rear vise bed and said rear vise moveable jaw being mounted on said rear vise bed for horizontal movement in a direction perpendicular to the direction of feed of the workpiece;
second means for moving said rear vise moveable jaw toward said rear vise fixed jaw to clamp a workpiece therebetween mounted on said rear vise bed;
a pair of parallel guide rails removably mounted on said brackets adjacent the cutting zone for aligning said front and rear vise means with each other so as to align said jaws in such a manner as to be at right angles to the cutting plane of said cutting tool, said vise beds being commonly mounted on and longitudinally slideable on said guide rails;
wherein said vise beds are formed with through bores for the passage therethrough of said guide rails, and said vise beds are mounted on said guide rails by the passage of said guide rails through said through bores;
third means for moving said rear vise bed along said guide rails toward and away from said front vise bed for feeding the workpiece into the cutting zone;
means disposed in said cutting machine directly beneath the cutting zone for collecting and removing cutting oil and chips; and
fourth means for moving said front vise bed along said guide rails away from the cutting zone a sufficient distance so as to facilitate removal of cutting chips from the cutting zone and into said collecting and removing means;

2. A cutting machine according to claim 1 wherein said means for collecting and removing cutting oil and cutting chips comprises a downwardly inclined collecting pan located beneath said cutting zone, means disposed at the lowermost end of said collecting pan for filtering said cutting oil and means arranged in said collecting pan for conveying said cutting chips from a point adjacent the lowermost end of said collecting pan to a point adjacent the uppermost end thereof.

3. A cutting machine according to claim 2 wherein said filtering means comprises a filter and a chip collecting box disposed beneath said filter for collecting the cutting chips which pass through siad filter.

* * * * *